United States Patent
Hussain et al.

(10) Patent No.: US 10,064,170 B2
(45) Date of Patent: Aug. 28, 2018

(54) ENHANCED PHYSICAL DOWNLINK CONTROL CHANNEL SUPPORTING COMMON SEARCH SPACE

(71) Applicant: Apple Inc., Cupertino, CA (US)

(72) Inventors: Awais M. Hussain, Milpitas, CA (US); Tarik Tabet, Los Gatos, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 15/076,967

(22) Filed: Mar. 22, 2016

(65) Prior Publication Data
US 2016/0295558 A1 Oct. 6, 2016

Related U.S. Application Data

(60) Provisional application No. 62/142,830, filed on Apr. 3, 2015.

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01)

(58) Field of Classification Search
CPC ........... H04W 72/042; H04W 72/0446; H04W 68/02; H04L 5/0053; H04L 5/0091; H04L 5/0092; H04L 5/001; H04L 5/0089; H04L 5/0023
USPC .................................................. 370/329, 330
See application file for complete search history.

(56) References Cited

U.S. PATENT DOCUMENTS

| 8,606,286 | B2 | 12/2013 | Vrzic et al. | |
|---|---|---|---|---|
| 9,049,712 | B2 | 6/2015 | Baker et al. | |
| 2011/0085513 | A1* | 4/2011 | Chen | H04W 72/042 370/330 |
| 2011/0128921 | A1* | 6/2011 | Ray | H04L 5/0037 370/329 |

(Continued)

FOREIGN PATENT DOCUMENTS

WO 2015018005 A1 2/2015

OTHER PUBLICATIONS

International Search Report and Written Opinion for PCT/US2016/024040, dated Jun. 9, 2016, pp. 1-13.

(Continued)

*Primary Examiner* — Afsar M Qureshi
(74) *Attorney, Agent, or Firm* — Meyertons Hood Kivlin Kowert & Goetzel, P.C.; Jeffrey C. Hood

(57) ABSTRACT

This disclosure relates to techniques for transmitting and receiving control information in the common search space on an enhanced physical downlink control channel (EPDCCH). According to some embodiments, a cellular base station may allocate some resource blocks of a subframe as the EPDCCH. The cellular base station may provide control information on a common search space in the EPDCCH for wireless user equipment (UE) devices in the cell provided by the cellular base station during a subframe. A UE device may monitor the EPDCCH to determine whether any indication on the common search space decodable by the UE device is contained in the EPDCCH, and may decode such information if present.

12 Claims, 6 Drawing Sheets

(56) References Cited

U.S. PATENT DOCUMENTS

| | | | | |
|---|---|---|---|---|
| 2014/0211750 | A1* | 7/2014 | Larsson | H04L 5/0092 370/330 |
| 2015/0043448 | A1* | 2/2015 | Chatterjee | H04W 8/005 370/329 |
| 2015/0289280 | A1* | 10/2015 | Davydov | H04W 72/12 370/252 |
| 2015/0304991 | A1* | 10/2015 | Chen | H04L 5/0053 370/329 |
| 2015/0327224 | A1* | 11/2015 | Guan | H04L 5/0053 370/329 |
| 2016/0143029 | A1* | 5/2016 | Goto | H04L 5/0044 370/329 |
| 2016/0309470 | A1* | 10/2016 | Yi et al. | H04W 56/001 |

OTHER PUBLICATIONS

Fujitsu: "Consideration of reference signals on NCT for potential use case of Rel-12 EPDCCH," 3GPP TSG-RAN WG1 Meeting #72, R1-130168, St. Julians, Malta, Jan. 28 To Feb. 1, 2013, pp. 1-2.

Alcatel-Lucent, Alcatel-Lucent Shanghai Bell: "Common Control messages for LC-MTC," 3GPP TSG RAN WG1 Meeting #80, R1-150130, Athens, Greece, Feb. 9-13, 2015, pp. 1-4.

Sharp: "Common search space design for ePDCCH," 3GPP TSG RAN WG1 Meeting #67, R1-113827, San Francisco, USA, Nov. 14-18, 2011, pp. 1-3.

* cited by examiner

ENHANCED PHYSICAL DOWNLINK CONTROL CHANNEL SUPPORTING COMMON SEARCH SPACE

PRIORITY INFORMATION

This application claims priority to U.S. provisional patent application Ser. No. 62/142,830, entitled "Enhanced Physical Downlink Control Channel Supporting Common Search Space," filed Apr. 3, 2015, which is hereby incorporated by reference in its entirety as though fully and completely set forth herein.

FIELD

The present application relates to wireless devices, including techniques for providing a common search space using an enhanced physical downlink control channel.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications and device types. Different types, classes, and/or categories of devices, and of applications executing on those devices, may have different capabilities and characteristics. Cellular communication techniques which do not take into account the different device and/or application characteristics of the various device and/or application types utilizing cellular communication may operate inefficiently. Accordingly, improvements in the field would be desirable.

SUMMARY

Embodiments are presented herein of, inter alia, apparatuses, systems, and methods for providing a common search space using an enhanced physical downlink control channel in a cellular communication system.

According to the techniques described herein, a base station that provides a cell in a wireless communication system may allocate some downlink resources to provide an enhanced physical downlink control channel (EPDCCH) in at least some subframes. The specific resources selected (e.g., which physical resource blocks) may depend on any of various considerations. As one possible consideration, the amount of downlink bandwidth in the cell may affect how many resources are allocated to the EPDCCH. For example, a greater amount of bandwidth may be allocated to the EPDCCH for cells that have greater overall amounts of downlink bandwidth. As another possible consideration, the amount of control information that is to be provided on the EPDCCH may affect how many resources are allocated to the EPDCCH. For example, a greater amount of bandwidth may be allocated to the EPDCCH during subframes when there is more control information to be provided than during subframes when there is less (or even no) control information to be provided.

In some instances, there may be certain cell resources that are specified for EPDCCH use, if needed, for a given subframe. Which cell resources are specified for this purpose may depend on any of various factors; as one possibility, a formula based on a cell identifier of the cell provided by the base station and a subframe number of a particular subframe may be used to determine which cell resources are specified for EPDCCH use during that particular subframe. The cell resources may be distributed throughout the cell bandwidth, or may be clustered together, according to various embodiments.

In some instances, a base station may determine not to allocate all of the resources specified for EPDCCH use in a given subframe. For example, if there is a relatively small amount of control information to be provided in a given subframe, only a portion of the resources specified for EPDCCH use in the subframe may actually be allocated as the EPDCCH in the subframe. As another example, if there is no control information to be provided in a given subframe, none of the resources specified for EPDCCH use in the subframe may actually be allocated as the EPDCCH in the subframe. The resources not allocated to the EPDCCH may instead be allocated to a physical downlink shared channel or other use, if desired, which may improve resource use efficiency.

The base station may provide control information on a common search space in the EPDCCH for wireless devices in a tracking area of the cell provided by the base station. The wireless devices may correspondingly be configured to search the common search space of the EPDCCH for control information indications, for example by determining a number of common search space candidates in the EPDCCH common search space of the cell and blind decoding each such common search space candidate.

This may in turn allow the wireless devices to receive paging message indications, obtain system information indications, and/or receive other control information provided on the common search space even while operating in an idle mode.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
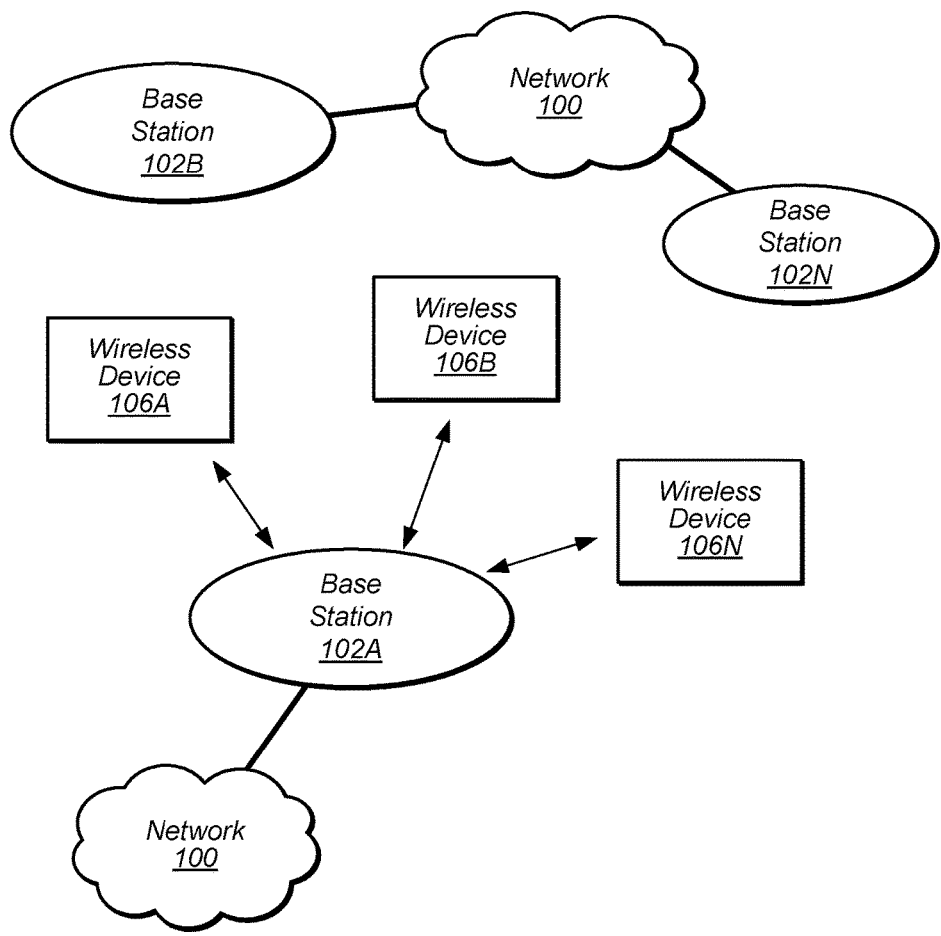
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses) laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
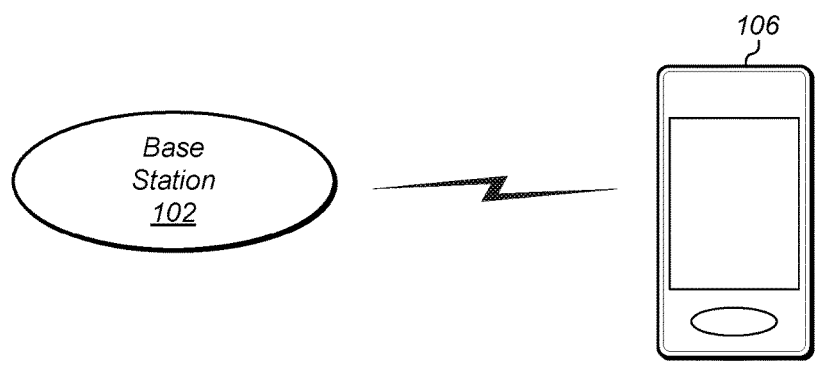
FIG. 2 illustrates an exemplary (and simplified) base station (BS) in communication with a wireless device, according to some embodiments.
Figure 3:
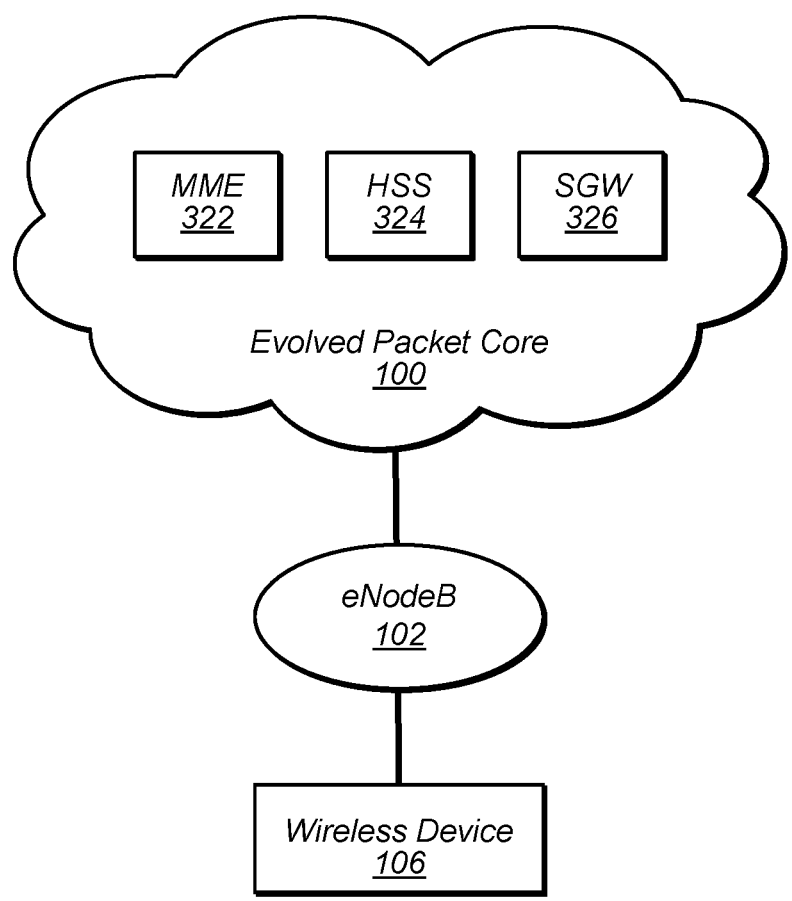
FIG. 3 illustrates aspects of an exemplary wireless communication system, according to some embodiments.

FIGS. 1-3—Communication System

FIG. 1 illustrates an exemplary (and simplified) wireless communication system, according to some embodiments. It is noted that the system of FIG. 1 is merely one example of a possible system, and that features of the present disclosure may be implemented in any of various systems, as desired.

As shown, the exemplary wireless communication system includes a base station 102A which communicates over a transmission medium with one or more wireless devices 106A, 106B, etc., through 106N. Some or all of the wireless devices may be user devices, which may be referred to herein as "user equipment" (UE) or UE devices.

The base station 102A may be a base transceiver station (BTS) or cell site, and may include hardware that enables wireless communication with the wireless devices 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102A and other similar base stations (such as base stations 102B . . . 102N) operating according to the same or a different cellular communication technology may thus be provided as a network of cells, which may provide continuous or nearly continuous overlapping service to wireless devices 106A-N and similar devices over a geographic area via one or more cellular communication technologies Thus, while base station 102A may provide a "serving cell" for wireless devices 106A-N as illustrated in FIG. 1, each wireless device 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Note also that in some instances, a UE (such as one of UEs 106A-N) may be served by multiple neighboring cells (e.g., a serving set), for example using coordinated multipoint (CoMP) wireless communication. Other configurations are also possible.

Note that at least in some instances a wireless device 106 may be capable of communicating using multiple wireless communication technologies. For example, a wireless device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a wireless device 106 (e.g., a specialized wireless device) may be configured to communicate using only a single wireless communication technology.

Figure 7:
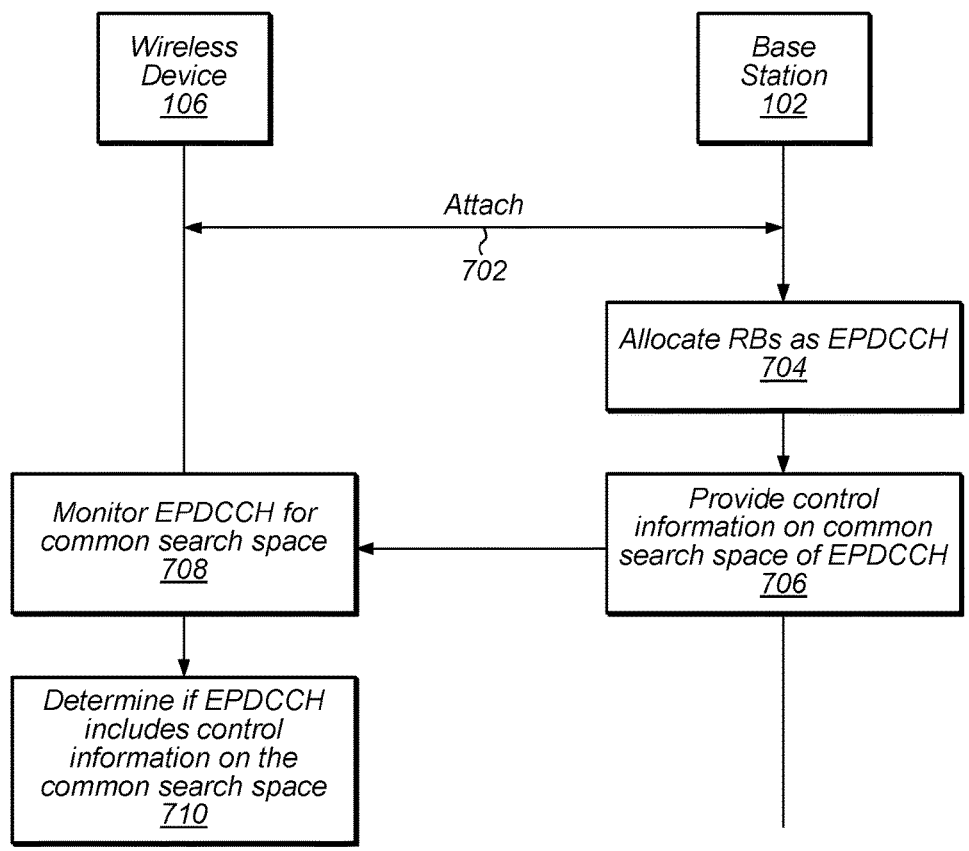
FIG. 7 is a communication flow diagram illustrating an exemplary method for providing common search space using an enhanced physical downlink control channel (EPDCCH) in a cellular communication system, according to some embodiments.

Any or all of the network 100, base stations 102, and/or wireless devices 106 illustrated in FIG. 1 may be configured to implement or support implementation of part or all of the methods described herein, including, inter alia, the method of FIG. 7.

FIG. 2 illustrates wireless device 106 (e.g., one of the devices 106A through 106N) in communication with a base station 102 (e.g., one of the base stations 102A through 102N). The wireless device 106 may be a UE device with cellular communication capability such as a mobile phone, a hand-held device, a computer or a tablet, or virtually any type of wireless device.

The wireless device 106 may include a processor that is configured to execute program instructions stored in memory. The wireless device 106 may perform any of the method embodiments described herein by executing such stored instructions. Alternatively, or in addition, the wireless device 106 may include a programmable hardware element such as an FPGA (field-programmable gate array) that is configured to perform any of the method embodiments described herein, or any portion of any of the method embodiments described herein.

In some embodiments, the wireless device 106 may be configured to communicate using any of multiple radio access technologies/wireless communication protocols. For example, the wireless device 106 may be configured to communicate using two or more of GSM, UMTS, CDMA2000, LTE, LTE-A, WLAN/Wi-Fi, or GNSS. Other combinations of wireless communication technologies are also possible.

The wireless device 106 may include one or more antennas for communicating using one or more wireless communication protocols or technologies. In one embodiment, the wireless device 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 106 may share one or more parts of a receive and/or transmit chain between multiple wireless communication technologies, such as those discussed above.

In some embodiments, the wireless device 106 may include separate transmit and/or receive chains (e.g., including separate RF and/or digital radio components) for each wireless communication technology with which it is configured to communicate. As a further possibility, the wireless device 106 may include one or more radios which are shared between multiple wireless communication technologies, and one or more radios which are used exclusively by a single wireless communication technology. For example, the wireless device 106 might include a shared radio for communicating using either of LTE and 1×RTT (or LTE and GSM), and separate radios for communicating using each of Wi-Fi and Bluetooth. Other configurations are also possible.

FIG. 3 illustrates an exemplary, simplified portion of a wireless communication system in an LTE network. Note that references to LTE herein may include present and/or future versions of LTE, for example including LTE-A.

As shown, the wireless device 106 may be in communication with a base station, shown in this exemplary embodiment as an eNodeB 102. For example, the wireless device 106 may utilize an evolved UMTS terrestrial radio access (E-UTRA) air interface to communicate with the eNodeB 102.

In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

Thus, the system of FIG. 3 illustrates an exemplary portion of an LTE wireless communication network.

Figure 4:
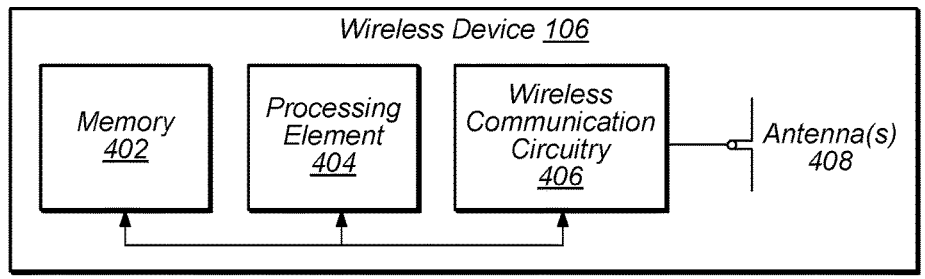
FIG. 4 illustrates an exemplary block diagram of a wireless device, according to some embodiments.

FIG. 4—Exemplary Block Diagram of a Wireless Device

FIG. 4 illustrates an exemplary block diagram of a wireless device 106 which may be configured for use in conjunction with various aspects of the present disclosure. The device 106 may be any of a variety of types of device and may be configured to perform any of a variety of types of functionality. For example, the device 106 may be a substantially portable device (a mobile device), such as a mobile phone, a personal productivity device, a wearable device, a computer or a tablet, a handheld gaming console, a portable media player, etc. Alternatively, the device 106 may be a substantially stationary device, such as a weather station, a process control element, a measurement device, a television, a subwoofer, speaker, or other audio rendering device, a set-top box, etc., if desired.

As one possibility, the device 106 may be a class of device which is considered link-budget limited; for example, the device 106 may be a device with limited power and/or design constraints which limit its link budget capability relative to other device classes. For example, the device 106 may be a type of device which primarily or exclusively performs machine type communication (MTC), which may include periodic and/or low data rate communication, at least in some instances. For devices which only need to perform such communication (e.g., process control devices, automation devices, measurement/monitoring devices such as thermometers, barometers, hydrometers, electricity meters, seismometers, etc.), device implementation may be simplified and power consumption may be reduced in a manner such that the devices are link budget limited. In another example, the device 106 may be any of the types of substantially portable devices described above. As another possibility, the device 106 may belong to a different class of device (e.g., having a higher link budget).

As shown, the device 106 may include a processing element 404. The processing element 404 may include or be coupled to one or more local and/or system memory elements, such as memory 402. Memory 402 may include any of a variety of types of memory and may serve any of a variety of functions. For example, memory 402 could be RAM serving as a system memory for processing element 404. Other types and functions are also possible.

The device 106 may also include wireless communication circuitry 406. The wireless communication circuitry 406 may include analog and/or digital circuitry components, and include one or more radios. In general, a radio may include any combination of a baseband processor, analog RF signal processing circuitry (e.g., including filters, mixers, oscillators, amplifiers, etc.), or digital processing circuitry (e.g., for digital modulation as well as other digital processing). A radio may implement one or more receive and transmit chains using the aforementioned hardware. In some instances, the wireless device 300 may share one or more parts of a receive and/or transmit chain between multiple wireless communication technologies, such as those discussed herein above. The wireless communication circuitry may be coupled to one or more antennas 408.

Note that if desired, the wireless communication circuitry 406 may include an on-board processing element in addition to processing element 404; for example, processing element 404 may be an 'application processor' while wireless communication circuitry 406 may include its own 'baseband processor'; alternatively (or in addition), processing element 404 may provide processing capability for the wireless communication circuitry 406. The device 106 may be capable of communicating using any of various wireless communication technologies by way of wireless communication circuitry 406 and antenna(s) 408.

The device 106 may additionally include any of a variety of other components (not shown) for implementing device functionality, depending on the intended functionality of the device 106, which may include further processing and/or memory elements, one or more power supply elements (which may rely on battery power and/or an external power source) user interface elements (e.g., display, speaker, microphone, camera, keyboard, mouse, touchscreen, etc.), test and/or measurement elements, additional communication elements (e.g., antenna(s) for wireless communication, I/O ports for wired communication, communication circuitry/controllers, etc.) and/or any of various other components.

The components of the device 106, such as processing element 404, memory 402, wireless communication circuitry 406, and antenna(s) 408, may be operatively coupled via one or more intra-chip and/or inter-chip interconnection interfaces, which may include any of a variety of types of interface, possibly including a combination of multiple types of interface. As one example, a USB high-speed inter-chip (HSIC) interface may be provided for inter-chip communications between processing element 404 and wireless communication circuitry 406. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 404, memory 402, wireless communication circuitry 406, and/or any of various other device components. Other types of interfaces (e.g., peripheral interfaces for communication with peripheral components within or external to device 106, etc.) may also be provided as part of device 106.

As described herein, the device 106 may include hardware and software components for implementing features for utilizing common search space of an enhanced physical downlink control channel, such as those described herein with reference to, inter alia, FIG. 7.

Figure 5:
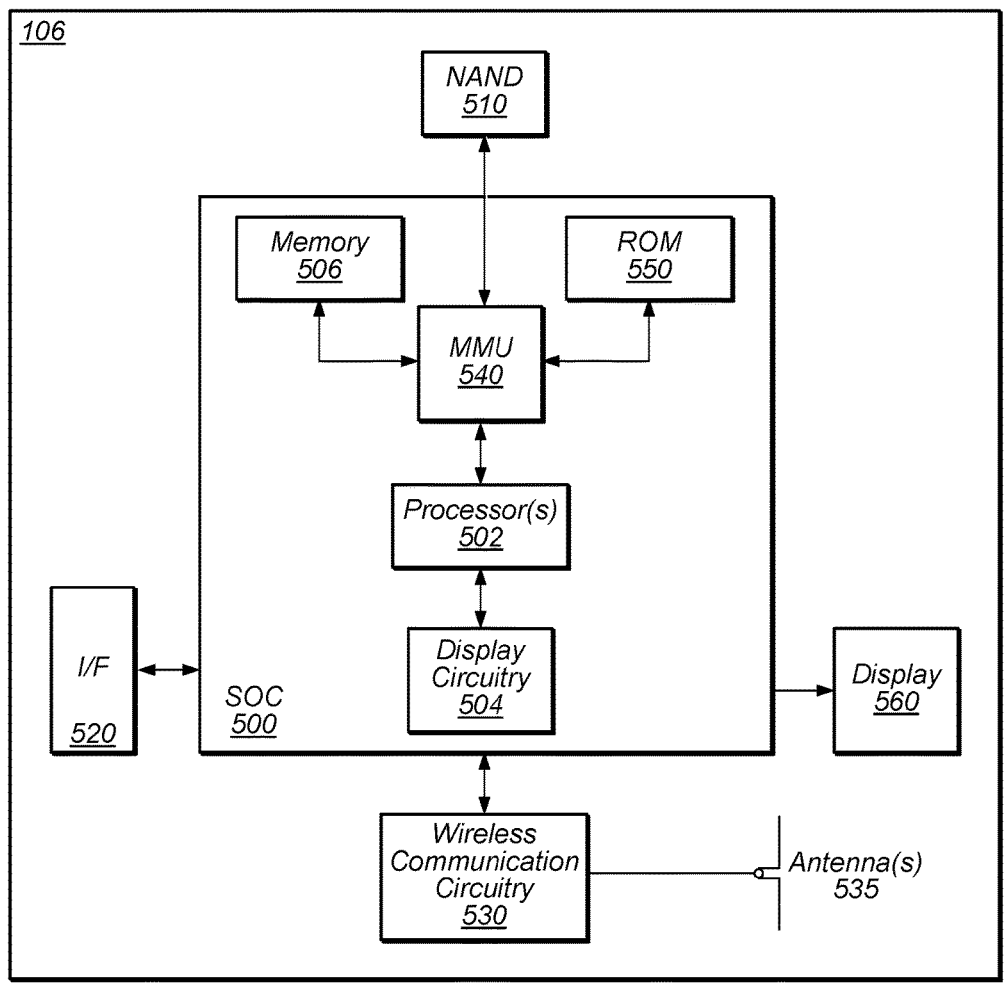
FIG. 5 illustrates an exemplary block diagram of a wireless user equipment (UE) device, according to some embodiments.

FIG. 5—Exemplary Block Diagram of a UE

FIG. 5 illustrates an exemplary block diagram of a UE type wireless device 106. As shown, the UE 106 may include a system on chip (SOC) 500, which may include portions for various purposes. For example, as shown, the SOC 500 may include processor(s) 502 which may execute program instructions for the UE 106 and display circuitry 504 which may perform graphics processing and provide display signals to the display 560. The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, wireless communication circuitry 530 (e.g., including one or more radios), connector I/F 520, and/or display 560. The MMU 540 may be configured to perform memory protection and page table translation or set up. In some embodiments, the MMU 540 may be included as a portion of the processor(s) 502.

As also shown, the SOC 500 may be coupled to various other circuits of the UE 106. For example, the UE 106 may include various types of memory (e.g., including NAND flash 510), a connector interface 520 (e.g., for coupling to a computer system, dock, charging station, etc.), the display 560, and wireless communication circuitry 530 (e.g., for LTE, CDMA2000, Bluetooth, Wi-Fi, etc.).

As noted above, the UE 106 may be configured to communicate wirelessly using multiple wireless communication technologies. As further noted above, in such instances, the wireless communication circuitry 530 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 535 to perform the wireless communication.

The UE 106 may also include and/or be configured for use with one or more user interface elements. The user interface elements may include any of various elements, such as display 560 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 106 may include hardware and software components for implementing features for utilizing common search space of an enhanced physical downlink control channel, such as those described herein with respect to, inter alia, FIG. 7. The processor 502 of the UE device 106 may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE device 106, in conjunction with one or more of the other components 500, 504, 506, 510, 520, 530, 535, 540, 550, 560 may be configured to implement part or all of the features described herein.

Figure 6:
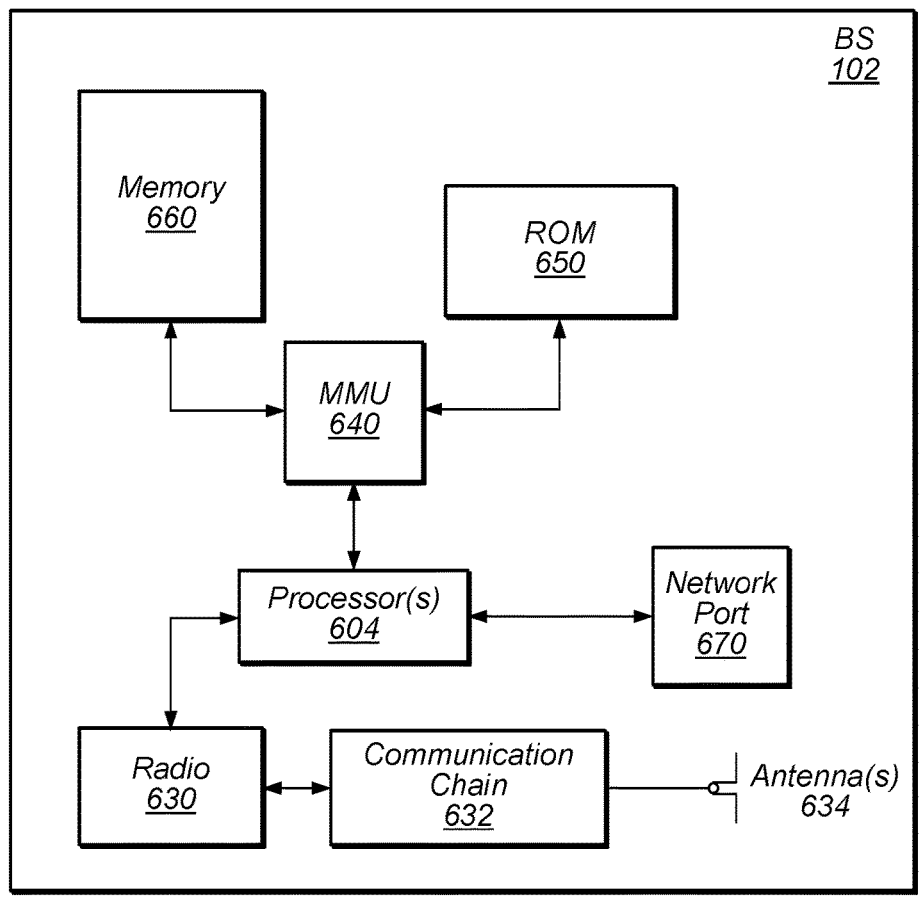
FIG. 6 illustrates an exemplary block diagram of a BS, according to some embodiments.

FIG. 6—Base Station

FIG. 6 illustrates an exemplary block diagram of a base station 102. It is noted that the base station of FIG. 6 is merely one example of a possible base station. As shown, the base station 102 may include processor(s) 604 which may execute program instructions for the base station 102. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The base station 102 may include at least one network port 670. The network port 670 may be configured to couple to a telephone network and provide a plurality of devices, such as wireless devices 106, access to the telephone network as described above.

The network port 670 (or an additional network port) may also or alternatively be configured to couple to a cellular network, e.g., a core network of a cellular service provider. The core network may provide mobility related services and/or other services to a plurality of devices, such as wireless devices 106. In some cases, the network port 670 may couple to a telephone network via the core network, and/or the core network may provide a telephone network (e.g., among other wireless devices serviced by the cellular service provider).

The base station 102 may include at least one antenna 634. The antenna(s) 634 may be configured to operate as a wireless transceiver and may be further configured to communicate with wireless devices 106 via radio 630. The antenna(s) 634 communicates with the radio 630 via communication chain 632. Communication chain 632 may be a receive chain, a transmit chain or both. In some implementations, communication chain 632 may include multiple receive chains, multiple transmit chains, or both. The radio 630 may be configured to communicate via various wireless communication technologies, including, but not limited to, LTE, GSM, WCDMA, CDMA2000, etc.

The processor(s) 604 of the base station 102 may be configured to implement part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

FIG. 7—Communication Flow Diagram

According to the current LTE specifications, an enhanced physical downlink control channel (EPDCCH) may be used for device-specific search space assignments, which may be provided after a radio resource control (RRC) connection is established. Thus, the EPDCCH as currently specified may not be usable for wireless devices in RRC idle mode.

However, at least in some circumstances, it may be desirable that an EPDCCH be available for wireless devices to receive paging messages, system information messages, and/or other information while in RRC idle mode. Accordingly, techniques are provided herein for providing an EPDCCH which allows common search space assignments.

FIG. 7 is a communication flow diagram illustrating an example of one possible method for a base station to send control information on an EPDCCH where the assignments are searched by wireless devices in a common search space. The method of FIG. 7 may be used in conjunction with any of the computer systems or devices shown in the above Figures, among other devices. As one possibility, the method may be performed between a wireless device 106 and a base station 102. Note that the scheme shown in FIG. 7 may be used in conjunction with LTE systems as one possibility, or in conjunction with any of various other cellular systems, as desired.

Note that in various embodiments, some of the elements of the method shown may be performed concurrently, in a different order than shown, substituted for by other elements, or may be omitted. Additional elements may also be performed as desired. As shown, the method may operate as follows.

In 702, the wireless device may attach to a cell provided by the base station. Attaching to the cell may include acquiring system information (e.g., that the base station may broadcast in a system information block) and registering with the base station. The wireless device may subsequently operate in an "idle mode." In the idle mode, the wireless device may periodically monitor the cell for paging information directed to the wireless device at scheduled intervals, and enter a low power state (e.g., by powering down some or all radio components) or "sleep" between such scheduled intervals. The wireless device may attach to the cell (and generally communicate with the base station providing the cell) according to any of various RATs, and the manner in which the wireless device attaches to the cell may vary depending on a RAT according to which the wireless device and the base station communicate. As one specific possibility, the wireless device and the base station may communicate according to LTE.

In 704, the base station 102 may allocate certain resource blocks (RBs) of its downlink bandwidth as an enhanced physical downlink control channel (EPDCCH) for common search space purposes. In some instances, the RBs selected for the EPDCCH may be a contiguous set of virtual resource blocks (VRBs), e.g., a set of RBs having contiguous VRB indices. The VRBs may then be mapped to physical resource blocks (PRBs), for example using a predetermined formula. The mapping may result in the PRBs selected for the EPDCCH being distributed throughout the downlink bandwidth of the cell. Alternatively, RB allocation resulting in localized transmission (e.g., with contiguous PRB selection) of the EPDCCH may be used if desired.

The VRBs may be selected in a predetermined manner. For example, the VRBs used for the EPDCCH in a given subframe may be selected according to a predetermined formula based on a cell identifier (physical cell-id) and the subframe number of the subframe. Thus a wireless device may determine which PRBs may be assigned to carry the EPDCCH without active interaction with the base station (e.g., by passively monitoring the cell and calculating the PRB assignment for the EPDCCH for a given subframe based on the subframe number, the cell-id of the cell, the downlink bandwidth of the cell, and one or more formulas known from specification documents or other pre-configuration).

Alternatively, the PRB resources selected for such an EPDCCH by the base station may be broadcast as part of system information in a broadcast system information block (SIB) (e.g., a new SIB may be defined for this purpose and this new SIB may or may not require a PDCCH). Thus a wireless device may determine which PRBs may be assigned to carry the EPDCCH without active interaction with the base station (e.g., by passively monitoring system information of the cell).

In some embodiments, the base station may subdivide the RBs of the EPDCCH into two (or more) subgroups. For example, the EPDCCH RBs may be indexed in order of PRB index number, with a first subgroup of EPDCCH RBs having even EPDCCH RB indices and a second subgroup of EPDCCH RBs having odd EPDCCH RB indices. Other subdivision techniques are also possible.

The EPDCCH may include multiple enhanced control channel elements (ECCEs), which may (at least in some instances) also be indexed. In some embodiments, different subsets of the ECCEs, each subset having contiguous ECCE indices, may be assigned to different EPDCCH RB subgroups.

As part of allocating RBs to the EPDCCH, the base station may determine a number of RBs to assign to the EPDCCH (e.g., in addition to determining which PRBs will carry the EPDCCH RBs). In some instances, a number of RBs allocated as the EPDCCH (or which may potentially be allocated to the EPDCCH) may be based at least in part on a downlink bandwidth of the cell. For example, a greater number of RBs may potentially be allocated to the EPDCCH for a cell with a greater total number of RBs available than for a cell with a lesser total number of RBs available. Furthermore, at least in some instances, it may be possible to dynamically scale the size of the EPDCCH (e.g., the number of RBs allocated to the EPDCCH) according to the amount of control information to be transmitted on the EPDCCH (and/or the level of redundancy needed), e.g., on a subframe-by-subframe (or frame-by-frame or other scale) basis.

For example, the base station may determine an amount of resources (e.g., ECCEs) required for control signaling carried on the common search space of the EPDCCH for wireless devices during a particular subframe, and select the number of RBs to allocate as the EPDCCH during that subframe at least in part based on the amount of resources required for control signaling carried on the common search space of the EPDCCH for wireless devices during the subframe. In some instances, selection of the number of RBs to allocate to the EPDCCH may include selection of an integer number of EPDCCH RB subgroups up to a maximum possible number of EPDCCH RB subgroups; for example, if two possible EPDCCH RB subgroups are defined, the base station may determine whether to allocate zero (e.g., in case there is no control information to be provided on the common search space in a given subframe), one (e.g., in case this is sufficient for the control information on the common search space to be provided in a given subframe), or two (e.g., in case more resources are needed for the control information on the common search space to be provided in a given subframe) EPDCCH RB subgroups to the EPDCCH. Thus, at least in some subframes, the base station 102 might not allocate any RBs to the EPDCCH. In such subframes, the RBs which could have been allocated to the EPDCCH (e.g., according to any selection formulas) may instead be allocated to a physical downlink shared channel, which may facilitate efficient resource usage including when minimal or no control information is transmitted on the EPDCCH.

In 706, the base station 102 may provide control information on the common search space using the EPDCCH. This may include transmitting the control information using the RBs allocated to the EPDCCH in each of one or more subframes.

The control information carried on the common search space may include any of a variety of types of information. As one possibility, the common search space may include assignments for one or more paging messages intended for one or more wireless devices in the tracking area of the cell. Each such paging message may be directed to a particular wireless device 106, at least in some instances. The intended use of the control information for paging may be indicated by encoding the cyclic redundancy check (CRC) of the control information using a paging radio network temporary identifier (P-RNTI), according to some embodiments. As another possibility, the control information may include assignment(s) for one or more system information messages. The CRC may in such a case be encoded using a system information radio network temporary identifier (SI-RNTI), according to some embodiments.

Note also that any of a variety of reference signals may be used in conjunction with the RBs used for such an EPDCCH supporting a common search space. As one possibility, demodulation reference signals may be provided by the base station (e.g., using antenna ports 107 and 109) in the RBs allocated for the EPDCCH, possibly in conjunction with (e.g., implementation specific) random beamforming (similar to the EPDCCHs used for device specific search spaces). As another possibility, cell-specific reference symbols (CRS) may be used for demodulation and space frequency block coding (SFBC) for transmit diversity may be used for modulated data REs.

In 708, the wireless device 106 may monitor the EPDCCH for a common search space during at least one subframe, and possibly multiple subframes. In order to monitor the EPDCCH for the common search space, the wireless device 106 may determine the RB allocation of the EPDCCH for the cell during each subframe during which the wireless device 106 monitors the EPDCCH. As noted above, the EPDCCH RB allocation (or potential allocation) may be predetermined according to one or more formulas, for example based on a subframe number of the subframe during which the wireless device 106 is monitoring the EPDCCH and/or cell identifier of the cell.

In some instances, the wireless device may also determine a number of common search space candidates in the EPDCCH for the cell in order to monitor the EPDCCH for control information. For example, there may be multiple possible ECCE aggregation levels used by the base station 102, and multiple possible candidates in the common search space depending on the selected aggregation level and maximum possible size (e.g., maximum potential number of RBs allocated) of the EPDCCH. The wireless device may then search (e.g., blind decode) each of the possible common search space candidates for control information. The wireless device may be required only to blind decode an agreed subset of all the possible common search space candidates for control information.

In 710, the wireless device 106 may determine if the EPDCCH includes any control information on the common search space that is decodable by the wireless device 106. For example, based on monitoring the EPDCCH, and possibly more particularly based on searching each of multiple possible candidates in the common search space, the wireless device 106 may be able to determine if any paging messages (e.g., with CRCs decodable using the P-RNTI), system information messages (e.g., with CRCs decodable using the SI-RNTI), or other messages decodable by the wireless device 106 are included in any of the EPDCCH common search space candidates.

If the common search space of the EPDCCH does indicate a paging message for the wireless device 106 during a particular subframe, the wireless device 106 may decode the paging message contained in the subframe. Similarly, if the common search space of the EPDCCH does indicate a system information message (and/or other message) decodable by the wireless device 106, the wireless device 106 may decode the system information message (and/or other message) contained in the subframe.

At least in some instances, if the wireless device 106 does determine that control information for a paging message is included in the common search space of the EPDCCH and decodes a paging message that happens to be addressed to the wireless device, the wireless device 106 and the base station 102 may proceed to establish a RRC connection between the wireless device 106 and the base station 102. In such a case, the wireless device may transition from the "idle mode" to a "connected mode". The wireless device 106 and the base station 102 may also establish a data radio bearer in order to perform (e.g., application) data communications via the RRC connection.

Figure 8:
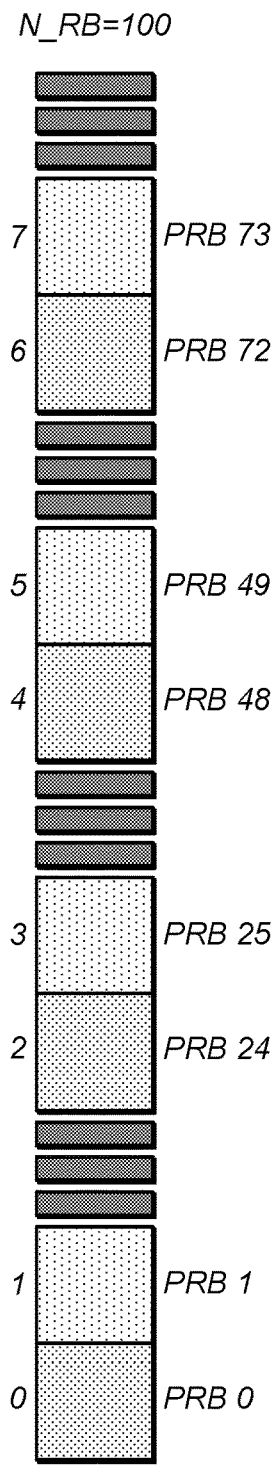
FIG. 8 illustrates an example of possible physical resource block selection and subgroups for an EPDCCH carrying control information on common search space, according to some embodiments.

FIG. 8—Exemplary EPDCCH PRB Selection and Subgroup Assignment and Additional Information FIG. 8 and the information provided herein below in conjunction therewith are provided by way of example of various considerations and details relating to possible systems with which the method of FIG. 7 may be implemented, and are not intended to be limiting to the disclosure as a whole. Numerous variations and alternatives to the details provided herein below are possible and should be considered within the scope of the disclosure.

According to the current 3GPP LTE specification documents, EPDCCH assignments are made on a UE-specific basis for a UE-specific search space. EPDCCH assignment to a UE may accordingly be made after an RRC connection is established. According to such a configuration, it may not be possible to use the EPDCCH for UEs in RRC-IDLE mode.

In some instances, according to the UE-specific search space EPDCCH configuration, two sets of up to 8 RBs may be allocated for the EPDCCH for a UE. Each RB may carry 4 ECCEs. The EPDCCH may thus allow higher aggregation levels (e.g., L=16, 32) compared to the PDCCH (e.g., L=8). It should however be noted, when comparing aggregation levels of EPDCCH versus PDCCH, that according to some embodiments, for normal subframes an ECCE may be made up of 4 enhanced resource element groups (EREGs) but an EREG may not always contain 9 resource elements (REs). Thus, an ECCE of the EPDCCH may contain less than 36 REs, at least in some instances. In contrast, a control channel element (CCE) of the physical downlink control channel (PDCCH) may always contain 36 REs.

In some instances, the space allocated for the EPDCCH as a UE-specific search space can alternatively be used for the PDSCH, e.g., at the discretion of the eNodeB, depending on whether there is any control information in the UE-specific search space to be transmitted on the EPDCCH.

However, it may be desirable, at least in some instances, that an EPDCCH be available for providing paging indications to UEs. This may be particularly useful, for example, for some link-budget limited UEs; for example, some such UEs may not monitor the PDCCH at all, and thus the EPDCCH (e.g., which may have certain characteristics better suited to link-budget limited UEs) may be used to provide paging indications to such devices if needed.

Accordingly, it is proposed herein to extend the EPDCCH to be able to provide a common search-space (SS), which may enable a base station to provide a UE with paging downlink control information (DCI) (e.g., using a P-RNTI) on the EPDCCH. Providing the common SS as part of the EPDCCH may also enable a base station to provide UEs with system information messages (e.g., using a SI-RNTI), in some embodiments.

As one possibility for providing an EPDCCH that supports a common search space, a fixed assignment of a number of RBs $N_{EPDCCH}$ may be allocated to the EPDCCH for the common search space. The allocated RBs may be distributed in frequency for a given downlink bandwidth. For example, as one possibility, $N_{EPDCCH}$ could be set to 8 RBs, which would allow a highest aggregation level of L=32.

In some instances, the ECCE mapping to RBs may be done in such a fashion that it is possible for the eNodeB to use only half of the RBs assigned for EPDCCH, i.e., $N_{EPDCCH}/2$ in some instances, for example for situations when there are fewer resources needed for the control information at the chosen aggregation level.

While in some instances $N_{EPDCCH}=8$ may be used, as noted above, a higher number of RBs (such as 16 RBs) may be used if desired (e.g., for sufficiently large downlink bandwidths), which may in turn allow aggregation levels higher than 32 (e.g., up to L=64 with 16 RBs).

As one possibility for determining which PRBs are assigned to the EPDCCH, the PRB assignment could be made a function of subframe-number in a predetermined manner. For example, one way to pick the PRBs may be to allocate a contiguous set of VRBs and map them to PRBs using the procedure in 3GPP TS 36.211, Section 6.2.3.2, with the exception that the PRB number in the even slot is used in both even and odd slots (or, alternatively, the PRB number in the odd slot may be used for both slots). The VRB selection in turn can be made a function of physical Cell-ID ($N_{ID}^{cell}$) and subframe-number (k), as one possibility. For example, one possible relation for selecting a set of $N_{EPDCCH}$ VRBs could be:

$$n_{VRB} = n + N_{EPDCCH} \bmod(k+N_{ID}^{cell}, \text{floor}(N_{RB}/N_{EPDCCH})),$$

where n=0, 1, ..., $N_{EPDCCH}-1$;
subframe number k=0, 1, ..., 9,
and $N_{RB}$ is the number of RB's in DL bandwidth.

Thus, in such a case, the PRBs assigned to the EPDCCH would be determinable by a UE without interaction with the eNodeB. Note that other techniques for selecting and/or indicating which RBs are assigned to the EPDCCH may be used; for example, as one possible alternative technique for indicating the EPDCCH RB assignments, the location of EPDCCH PRBs may be broadcast by the eNodeB in a system information block (SIB).

In some instances, it may be desirable to provide frequency diversity for the common search space (e.g., as no channel state information can be assumed, since multiple UEs may be receiving and those receiving UEs may be in idle mode). Accordingly, in some embodiments, a distributed transmission type may be used for the EPDCCH common search space.

As one possibility for providing pilot information, demodulation reference signals (DMRS) (e.g., such as further discussed in 3GPP TS 36.211, Section 6.10.3A) may be used in those RBs carrying the EPDCCH. The PRBS seed may be a function of cell-ID, or may be selected in any other desired way. In some instances, for example, antenna ports 107 and 109 (e.g., such as further discussed in 3GPP TS 36.211, Section 6.8A.5) of an eNB providing a cell may be used for DMRS with alternate REs in EREGs using port 107 and 109 respectively. Furthermore, implementation dependent random beamforming may be used on both ports independently, if desired. Alternatively (e.g., instead of using DMRS and random beamforming for the EPDCCH), cell-specific reference symbols may be used, for example with SFBC (transmit diversity), on the EPDCCH.

The mapping of EREGs to ECCEs may be performed in a distributed manner, e.g., according to 3GPP TS 36.211, 6.8A.1, according to some embodiments, or in another manner. As one possibility, the procedure may be modified, such as according to the following example of a mapping technique associated with FIG. 8.

According to the example of FIG. 8, a cell may be provided with a downlink bandwidth of 20 MHz, $N_{RB}=100$, and PRBs indexed from 0 to 99.

For the purpose of this example, consider that 8 PRBs may be assigned for the EPDCCH; in other words, $N_{EPDCCH}=8$ in this case. As an arbitrary example, the chosen eight PRBs for EPDCCH might be 0, 1, 24, 25, 48, 49, 72, and 73, as shown in FIG. 8. These PRBs may for example have been chosen corresponding to virtual resource blocks $n_{VRB}=\{0,1,2,3,4,5,6,7\}$ using a relation similar to those in 3GPP TS 36.211, Section 6.2.3.2.

In a given subframe, it may be the case that the eNodeB may or may not actually use these PRBs for EPDCCH. In order to facilitate partial usage of the assigned PRBs of the EPDCCH, the PRBs assigned to the EPDCCH, which have indices {0,1,2,3,4,5,6,7} (in this example of $N_{EPDCCH}=8$), may be considered as two different subgroups: a "first" subgroup with even indices {0,2,4,6} and a "second" subgroup with odd indices {1,3,5,7}.

Thus, in the example of FIG. 8, the even (first) subgroup PRBs may be 0, 24, 48, and 72, while the odd (second) subgroup PRBs may be 1, 25, 49, and 73. In order to facilitate both distribution throughout the bandwidth in combination with the possibility of partial usage of the assigned PRBs of the EPDCCH, the ECCEs of the EPDCCH common search space may be assigned in increasing order, first to the even-subgroup and then to the odd-subgroup. For example, ECCEs 0, ..., 15 may be assigned to the even-subgroup and ECCEs 16, ..., 31 may be assigned to the odd-subgroup. In other respects the procedure of distributed EREG mapping for an ECCE according to 3GPP TS 36.211, 6.8A.1 may be followed, if desired.

Thus, in such a scenario, for an aggregation level of L=16, it may be possible to provide two EPDCCH candidates, each consisting of 16 ECCEs. In such a case, the first candidate may occupy the even-subgroup and the second candidate may occupy the odd-subgroup.

Note further that, in practice, using such a methodology, it may be possible for a eNodeB to allocate only 4 PRBs for the EPDCCH while supporting an aggregation level up to L=16 (e.g., using the even or the odd subgroup). For L=32, at least 8 PRBs will be required.

Note that since it may be possible for the EPDCCH to be present on only one or the other PRB subgroup of the EPDCCH, at least in some such embodiments a UE may not make any assumptions about the presence of DMRS in the other subgroup's PRBs when estimating the channel (and performing other receiver tracking functions) even if the EPDCCH is determined to be present on one PRB subgroup of the EPDCCH.

Note also that (as may be the case for the PDCCH, at least in some instances), the ECCE selection for candidates in common search space may use $Y_{p,k}=0$, as discussed in 3GPP TS 36.213, Section 9.1.4, as one possibility.

Note also that (e.g., as an alternative to distributed transmission) in some instances localized transmission may be used for EPDCCH common search space.

According to some embodiments, the start symbol for the EPDCCH (e.g., as further discussed in 3GPP TS 36.213, Section 7.1.6.4) in a given subframe may be set to a maximum value possible for the downlink bandwidth of the cell regardless of the actual control format indicator (CFI) used in the subframe. For example, $I_{DataStart}=3$ for $N_{RB}>10$ and $I_{Datastart}=4$ for $N_{RB}<=10$, according to some embodiments.

As may be the case for the UE-specific search space of the EPDCCH, the PRBs allocated for EPDCCH common search space may instead be used for the PDSCH, e.g., at the discretion of eNodeB, for example depending on whether there is any control information to be transmitted on common search space of the EPDCCH, if desired. Such a determination may be made by the eNodeB on a subframe-by-subframe basis, in some instances.

For the UE-specific search space in the EPDCCH, the number of candidates monitored by a UE may be specified by lookup tables (e.g., in 3GPP TS 36.213, Section 9.1.4, as one possibility). As previously noted, at least in some embodiments, the common search space in the EPDCCH may be used for a link-budget limited class of UEs for paging messages. Since in at least some instances such UEs may not be monitoring the PDCCH, in some scenarios the number of candidates on common search space in the EPDCCH for such UEs may be separately specified.

It should be noted that according to the techniques described herein, it may be possible to provide higher aggregation levels (e.g., L=16, 32, 64, among various possibilities) in the common search space of the EPDCCH than in the common search space of the PDCCH, which may also be beneficial to link budget limited UEs.

In the following further exemplary embodiments are provided.

One set of embodiments may include a method for a cellular base station (BS) to provide a cell, comprising: by the BS: allocating a plurality of resource blocks (RBs) of a subframe as an enhanced physical downlink control channel (EPDCCH); providing control information on a common search space in the EPDCCH for wireless user equipment (UE) devices in a tracking area of the cell during the subframe, wherein providing the control information on the common search space for the wireless UE devices in the tracking area of the cell using the EPDCCH allows the wireless UE devices to receive paging message indications via the EPDCCH when operating in idle mode.

According to some embodiments, the method further comprises providing system information indications using the common search space.

According to some embodiments, allocating the plurality of RBs of a subframe as the EPDCCH comprises: selecting a contiguous set of virtual RBs (VRBs); and mapping the contiguous VRBs to PRBs according to a predetermined mapping function.

According to some embodiments, a number of RBs allocated as the EPDCCH for the cell is selected based at least in part on a downlink bandwidth of the cell.

According to some embodiments, the plurality of RBs allocated as the EPDCCH are indexed in order of PRB index number, wherein the plurality of RBs allocated as the EPDCCH comprise a first subgroup comprising RBs having even EPDCCH RB indices and a second subgroup having odd EPDCCH RB indices.

According to some embodiments, the EPDCCH comprises a plurality of indexed enhanced control channel elements (ECCEs), wherein a first subset of the ECCEs having contiguous indices are assigned to the first subgroup of the plurality of RBs allocated as the EPDCCH, wherein a second subset of the ECCEs having contiguous indices are assigned to the second subgroup of the plurality of RBs allocated as the EPDCCH.

According to some embodiments, the plurality of RBs allocated as the EPDCCH are selected based at least in part on a subframe index number of the subframe.

According to some embodiments, allocating the plurality of RBs as the EPDCCH further comprises: determining an amount of resources required to provide control information on common search space for wireless devices using the EPDCCH during the subframe; and selecting a number of RBs to allocate as the EPDCCH during the subframe at least in part based on determining the amount of resources required to provide control information on common search space for wireless devices using the EPDCCH during the subframe.

According to some embodiments, the method further comprises: providing demodulation reference signals in the plurality of RBs allocated as the EPDCCH.

A further set of embodiments may include a method for a wireless device, comprising: by the wireless device: attaching to a cell provided by a cellular base station; monitoring an enhanced physical downlink control channel (EPDCCH) of the cell on common search space during a subframe; and determining whether the common search space of the EPDCCH contains an indication decodable by the wireless device during the subframe based on monitoring the EPDCCH on the subframe.

According to some embodiments, the method further comprises: determining that the common search space of the EPDCCH comprises a paging message indication for the wireless device during the subframe; and decoding the paging message for the wireless device in the subframe.

According to some embodiments, the method further comprises: determining that the common search space of the EPDCCH contains a system information message indication decodable by the wireless device during the subframe; and decoding the system information message in the subframe.

According to some embodiments, the method further comprises: determining a number of common search space candidates in the EPDCCH common search space for the cell; and blind decoding each of the common search space candidates by the wireless device.

According to some embodiments, determining the number of common search space candidates for the EPDCCH common search space for the cell is based at least in part on a possible number of enhanced control channel element (ECCE) aggregation levels of the EPDCCH.

According to some embodiments, the method further comprises: determining a resource block (RB) allocation of the EPDCCH for the cell for the subframe based on a predetermined mapping function.

According to some embodiments, the predetermined mapping function is based on a cell identifier of the cell and a subframe number of the subframe.

Another set of embodiments may include a base station or wireless device, comprising: a radio; and a processing element operably coupled to the radio; wherein the processing element and the radio are configured to implement any or all of the method elements of any or all of the preceding examples.

A further exemplary set of embodiments may include a non-transitory computer accessible memory medium comprising program instructions which, when executed at a device, cause the device to implement any or all of the method elements of any or all of the preceding examples.

A still further exemplary set of embodiments may include a computer program comprising instructions for performing any or all of the method elements of any or all of the preceding examples.

Yet another exemplary set of embodiments may include an apparatus comprising means for performing any or all of the method elements of any or all of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a cellular base station (BS) to provide a cell, comprising:

by the BS:
  allocating a plurality of resource blocks (RBs) of a first subframe as an enhanced physical downlink control channel (EPDCCH) separately specified for link-budget limited user equipment (UE) devices;
  providing control information on a common search space in the EPDCCH for the link-budget limited UE devices in a tracking area of the cell during the first subframe, wherein providing the control information on the common search space for the link-budget limited UE devices in the tracking area of the cell using the EPDCCH allows the link-budget limited UE devices to receive paging message indications via the EPDCCH when operating in idle mode;
  determining that there is no control information to be transmitted on the common search space of the EPDCCH in a second subframe, wherein a subset of downlink RBs of the cell are specified for the common search space of the EPDCCH during the second subframe; and
  allocating the subset of downlink RBs of the cell specified for the common search space of the EPDCCH during the second subframe to a physical downlink shared channel (PDSCH) instead of the EPDCCH based on determining that there is no control information to be transmitted on the common search space of the EPDCCH in the second subframe.

2. The method of claim 1, further comprising:
providing system information indications using the common search space.

3. The method of claim 1, wherein allocating the plurality of RBs of the first subframe as the EPDCCH comprises:
selecting a contiguous set of virtual RBs (VRBs); and
mapping the contiguous VRBs to PRBs according to a predetermined mapping function.

4. The method of claim 1,
wherein a number of RBs allocated as the EPDCCH for the cell is selected based at least in part on a downlink bandwidth of the cell.

5. The method of claim 1,
wherein the plurality of RBs allocated as the EPDCCH are indexed in order of PRB index number, wherein the plurality of RBs allocated as the EPDCCH comprise a first subgroup comprising RBs having even EPDCCH RB indices and a second subgroup having odd EPDCCH RB indices.

6. The method of claim 5,
wherein the EPDCCH comprises a plurality of indexed enhanced control channel elements (ECCEs), wherein a first subset of the ECCEs having contiguous indices are assigned to the first subgroup of the plurality of RBs allocated as the EPDCCH, wherein a second subset of the ECCEs having contiguous indices are assigned to the second subgroup of the plurality of RBs allocated as the EPDCCH.

7. The method of claim 1,
wherein the plurality of RBs allocated as the EPDCCH are selected based at least in part on a subframe index number of the first subframe.

8. The method of claim 1, wherein allocating the plurality of RBs as the EPDCCH further comprises:
determining an amount of resources required to provide control information on the common search space for wireless devices using the EPDCCH during the first subframe; and
selecting a number of RBs to allocate as the EPDCCH during the first subframe at least in part based on determining the amount of resources required to provide control information on common search space for wireless devices using the EPDCCH during the first subframe.

9. The method of claim 1, further comprising:
providing demodulation reference signals in the plurality of RBs allocated as the EPDCCH.

10. A base station configured to provide a cell, comprising:
a radio; and
a processing element operably coupled to the radio;
wherein the radio and the processing element are configured to:
determine a number of resource blocks (RBs) of a first subframe to assign to an enhanced physical downlink control channel (EPDCCH), wherein determining the number of RBs of the subframe to assign to the EPDCCH dynamically scales a size of the EPDCCH in the first subframe based at least in part on an amount of control information to be transmitted on the EPDCCH in the first subframe; and
provide control information on a common search space in the EPDCCH for wireless devices in a tracking area of the cell during the first subframe;
determine that there is no control information to be transmitted on the common search space of the EPDCCH in a second subframe, wherein a subset of downlink RBs of the cell are specified for a common search space of the EPDCCH during the second subframe; and
allocate the subset of downlink RBs of the cell specified for the common search space of the EPDCCH during the second subframe to a physical downlink shared channel (PDSCH) instead of the EPDCCH based on determining that there is no control information to be transmitted on the common search space of the EPDCCH in the second subframe.

11. The base station of claim 10,
wherein providing the control information on the common search space for the wireless devices in the tracking area of the cell using the EPDCCH allows the wireless devices to receive one or more of paging message indications or system information indications via the EPDCCH when operating in idle mode.

12. The base station of claim 10, wherein a second subset of downlink RBs of the cell are specified for EPDCCH use during the first subframe, wherein the radio and the processing element are further configured to:
allocate at least a portion of the second subset of downlink RBs of the cell specified for EPDCCH use during the first subframe to the EPDCCH, wherein the at least a portion of the second subset of downlink RBs allocated to the EPDCCH comprises the determined number of RBs.

* * * * *